(12) United States Patent
Klaiber et al.

(10) Patent No.: US 8,127,098 B1
(45) Date of Patent: Feb. 28, 2012

(54) VIRTUALIZATION OF REAL MODE EXECUTION

(75) Inventors: Alexander C. Klaiber, Mountain View, CA (US); Kevin J. McGrath, Los Gatos, CA (US); Hongwen Gao, Union City, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 1816 days.

(21) Appl. No.: 11/066,873

(22) Filed: Feb. 25, 2005

Related U.S. Application Data (60) Provisional application No. 60/569,995, filed on May 11, 2004.

(51) Int. Cl.
 *G06F 12/14* (2006.01)
(52) U.S. Cl. ............... 711/163; 711/205; 711/151
(58) Field of Classification Search ............... 711/151, 711/152, 153, 205, 207, 163
See application file for complete search history.

(56) References Cited

U.S. PATENT DOCUMENTS

| | | | | |
|---|---|---|---|---|
| 5,060,137 | A * | 10/1991 | Bryg et al. ............... | 711/205 |
| 5,303,378 | A * | 4/1994 | Cohen ............... | 710/264 |
| 2003/0217250 | A1 | 11/2003 | Bennett et al. | |
| 2004/0117532 | A1 | 6/2004 | Bennett et al. | |

OTHER PUBLICATIONS

P.H. Gum, "System/370 Extended Architecture: Facilities for Virtual Machines," IBM J. Res Develop., vol. 27, No. 6, Nov. 1983, (pp. 530-544).
"Operating System Writer's Guide," Pentium Pro Family Developer's Manual, vol. 3, 1996, (12 Pages).
James L. Turley, "Advanced 80386 Programming Techniques," ISBN 0-07-881342-5, (35 Pages), Copyright 1988.
Frank van Gilluwe, "The CPU," The Undocumented PC, 1994, (3 Pages).
Robert Collins, "The LOADALL Instruction," http://thorkildsen.no/faqsys/docs/loadall2.txt, 1996, (10 Pages).
"LOADALL—Load All Registers," http://hysteria.sk/~mikro/Coding/PC/COMMANDS.TXT Feb. 24, 1995, (7 Pages).
"AAA—ASCII adjust AX after Addition," http://hysteria.sk/~mikro/Coding/PC/COMMANDS.TXT Feb. 24, 1995, (72 Pages).
"Does the Cyrix 6x86 support "unreal" mode," comp.sys.ibm.pc.hardware.chips, http://groups-beta.google.com/group/comp.sys.ibm.pc.html, Jun. 3-5, 1996, (9 Pages).

* cited by examiner

*Primary Examiner* — Kenneth Lo
(74) *Attorney, Agent, or Firm* — Lawrence J. Merkel; Meyertons, Hood, Kivlin, Kowert & Goetzel, P.C.

(57) ABSTRACT

In one embodiment, a processor is configured to operate in a first mode in which privilege level protection is disabled and paging is enabled. In another embodiment, a method is contemplated including intercepting a write to a control register by a guest executing in a processor; determining that the write attempts to establish a first mode in the processor in which privilege level protection is disabled and paging is disabled; and causing the guest to execute in a second mode in which privilege level protection is disabled and paging is enabled instead of the first mode. A computer accessible medium comprising instruction implementing at least a portion of the method is also described.

24 Claims, 9 Drawing Sheets

VIRTUALIZATION OF REAL MODE EXECUTION

This application claims benefit of priority to U.S. Provisional Patent Application Ser. No. 60/569,995, filed on May 11, 2004.

BACKGROUND

1. Field of the Invention

This invention relates to virtualization and the use of virtual machines in processors and computer systems and, more particularly, to virtualizing real mode execution.

2. Description of the Related Art

Virtualization has been used in computer systems for a variety of different purposes. For example, virtualization may be used to execute privileged software in a "container" to prevent the privileged software from directly accessing and/or making changes to at least some of the physical machine state without first being permitted to do so by a virtual machine manager that controls the virtual machine. Such a container may prevent "buggy" or malicious software from causing problems on the physical machine. Additionally, virtualization may be used to permit two or more privileged programs to execute on the same physical machine concurrently. The privileged programs may be prevented from interfering with each other since access to the physical machine is controlled. Privileged programs may include operating systems, and may also include other software which expects to have full control of the hardware on which the software is executing. In another example, virtualization may be used to execute a privileged program on hardware that differs from the hardware expected by the privileged program.

Generally, virtualization of a processor or computer system may include providing one or more privileged programs with access to a virtual machine (the container mentioned above) over which the privileged program has full control, but the control of the physical machine is retained by the virtual machine manager. The virtual machine may include a processor (or processors), memory, and various peripheral devices that the privileged program expects to find in the machine on which it is executing. Each privileged program (and related software in some cases, such as the applications that execute on an operating system) may be referred to herein as a guest. Virtualization may be implemented in software (e.g. the virtual machine manager (VMM) mentioned above) without any specific hardware virtualization support in the physical machine on which the VMM and its virtual machines execute. However, virtualization may be simplified and/or achieve higher performance if some hardware support is provided.

Typically, memory is virtualized in a virtual machine using address translation mechanisms, such as paging translation mechanisms. By translating addresses generated by guests executing in a virtual machine, the physical memory pages actually accessed by the virtual machine may be controlled. The guest itself may include page tables that it generates for the portions of the program that execute in a mode in which paging is enabled. However, the VMM overrides the guest's page tables with its own page tables to control the physical memory accessed by the virtual machine. In this manner, guests may be prevented from accessing (and particularly updating) pages allocated to other guests or to the VMM.

Many processor instruction set architectures support a "real mode" in which paging is not used. If the guest were permitted to execute in real mode, the paging mechanisms could not be used to control memory accessed by the guest. However, in some cases, operation of the processor as defined in the instruction set architecture may differ in real mode as compared to various other modes in which paging is enabled. For example, in the x86 instruction set architecture, certain instructions operate differently, some of the flags set during instruction execution differ, privilege level protections mechanisms are disabled, and operation of the segment registers in address generation differs in real mode as compared to modes in which paging is enabled (which are also modes in which protection is enabled). Programs, or code sequences within programs, that are written to run in real mode may depend on these other differences. Thus, the programs/code sequences may not merely be run in a mode in which paging is enabled. The x86 instruction set also defines a virtual 8086 mode (v86). The v86 mode resembles real mode operation while running in a protected mode (optionally with page enabled), but does not fully duplicate real mode operation. Thus, v86 mode cannot always be used for programs/code sequences that are to execute in real mode.

SUMMARY

In one embodiment, a processor comprises one or more registers configured to store a plurality of control indications, an address translation unit coupled to the one or more registers, and a protection unit coupled to the one or more registers. A first mode of the processor corresponds to a first state of the plurality of control indications, and, in the first mode, privilege level protection is disabled and paging is enabled. The address translation unit is configured to translate addresses generated by the processor during execution using one or more page tables if paging is enabled. The protection unit is configured to enforce privilege level protection if privilege level protection is enabled.

In another embodiment, a method is contemplated. A write to a control register by a guest executing in a processor is intercepted. The method further includes determining that the write attempts to establish a first mode in the processor in which privilege level protection is disabled and paging is disabled. The method still further includes causing the guest to execute in a second mode in which privilege level protection is disabled and paging is enabled instead of the first mode.

In still another embodiment, a computer accessible medium stores a plurality of instructions. The plurality of instructions include one or more instructions executed in response to a processor intercepting a write to a control register by a guest executing in a processor. The instructions, when executed, determine that the write attempts to establish a first mode in the processor in which privilege level protection is disabled and paging is disabled; and cause the guest to execute in a second mode in which privilege level protection is disabled and paging is enabled instead of the first mode.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Virtualization Overview

Figure 1:
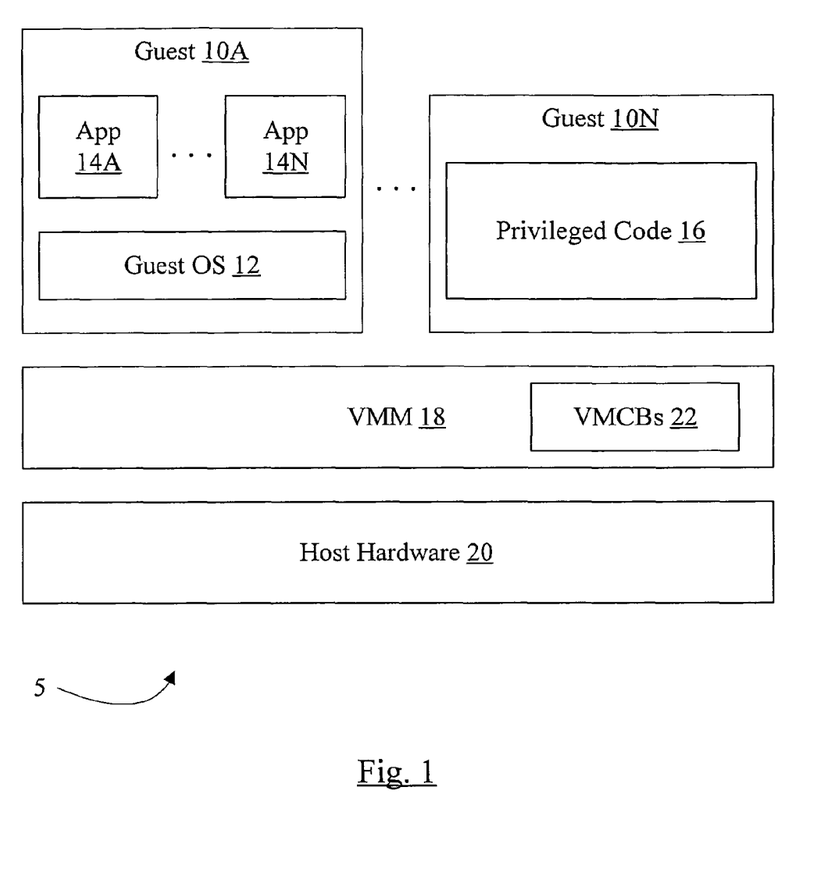
FIG. 1 is a block diagram of one embodiment of a computer system that implements virtualization.

Turning now to FIG. 1, a block diagram of one embodiment of a computer system 5 that implements virtualization is shown. In the embodiment of FIG. 1, multiple guests 10A-10N are shown. Guest 10A includes a guest operating system (OS) 12 and one or more applications 14A-14N that run on the guest OS 12. Guest 10N includes privileged code 16. The guests 10A-10N are managed by a virtual machine manager (VMM) 18. The VMM 18 and the guests 10A-10N execute on host hardware 20, which may comprise the physical hardware included in the computer system 5. In one embodiment, the VMM 18 may maintain a set of virtual machine control blocks (VMCBs) 22. There may be one VMCB 22 for each guest 10A-10N. While the VMCBs 22 are shown as part of the VMM 18 for illustration in FIG. 1, the VMCBs 22 may be stored in memory and/or on non-volatile media such as disk drives in the host hardware 20.

The host hardware 20 generally includes all of the hardware included in the computer system 5. In various embodiments, the host hardware 20 may include one or more processors, memory, peripheral devices, and other circuitry used to couple the preceding components. For example, common personal computer (PC)-style systems may include a Northbridge coupling the processors, the memory, and a graphics device that uses the advanced graphic port (AGP) interface. Additionally, the Northbridge may couple to a peripheral bus such as the peripheral component interface (PCI) bus, to which various peripheral components may be directly or indirectly coupled. A Southbridge may also be included, coupled to the PCI bus, to provide legacy functionality and/or couple to legacy hardware. In other embodiments, other circuitry may be used to link various hardware components. For example, HyperTransport™ (HT) links may be used to link nodes, each of which may include one or more processors, a host bridge, and a memory controller. The host bridge may be used to couple, via HT links, to peripheral devices in a daisy chain fashion. Any desired circuitry/host hardware structure may be used.

In some embodiments, one or more components of the host hardware may include hardware support for virtualization. For example, the processor(s) may include hardware support for virtualization, as will be described in more detail below.

The VMM 18 may be configured to provide the virtualization for each of the guests 10A-10N, and may control the access of the guests 10A-10N to the host hardware 20. The VMM 18 may also be responsible for scheduling the guests 10A-10N for execution on the host hardware 20. The VMM 18 may be configured to use the hardware support provided in the host hardware 20 for virtualization.

In some embodiments, the VMM 18 may be implemented as a "thin" standalone software program that executes on the host hardware 20 and provides the virtualization for the guests 10A-10N. Such a VMM implementation may sometimes be referred to as a "hypervisor". In other embodiments, the VMM 18 may be integrated into or execute on a host OS. In such embodiments, the VMM 18 may rely on the host OS, including any drivers in the host OS, platform system management mode (SMM) code provided by the system BIOS, etc. Thus, the host OS components (and various lower-level components such as the platform SMM code) execute directly on the host hardware 20 and are not virtualized by the VMM 18.

In various embodiments, the VMM 18 may support full virtualization, para-virtualization, or both. Furthermore, in some embodiments, the VMM 18 may concurrently execute guests that are paravirtualized and guests that are fully virtualized.

With full virtualization, the guest 10A-10N is not aware that virtualization is occurring. Each guest 10A-10N may have contiguous, zero based memory in its virtual machine, and the VMM 18 may use shadow page tables to remap from guest virtual addresses to host physical addresses (effectively the remapping the guest "physical address" assigned by memory management software in the guest 10A-10N to host physical address). Using the shadow page tables for each guest 10A-10N, the VMM 18 may ensure that guests do not access other guest's physical memory in the host hardware 20. In one embodiment, in full virtualization, guests 10A-10N do not directly interact with the peripheral devices in the host hardware 20.

With para-virtualization, guests 10A-10N may be at least partially VM-aware. Such guests 10A-10N may negotiate for memory pages with the VMM 18, and thus remapping guest physical addresses to host physical addresses may not be required. In one embodiment, in paravirtualization, guests 10A-10N may be permitted to directly interact with peripheral devices in the host hardware 20. At any given time, a peripheral device may be "owned" by a guest or guests 10A-10N. In one implementation, for example, a peripheral device may be mapped into a protection domain with one or more guests 10A-10N that currently own that peripheral device. Only guests that own a peripheral device may directly interact with it. There may also be a protection mechanism to prevent devices in a protection domain from reading/writing pages allocated to a guest in another protection domain (e.g. using device exclusion vectors for each protection domain that define which physical pages are accessible to the device and which are not).

As mentioned previously, the VMM 18 may maintain a VMCB 22 for each guest 10A-10N. The VMCB 22 may generally comprise a storage area that is allocated by the VMM 18 for the corresponding guest 10A-10N. In one embodiment, the VMCB 22 may comprise a page of memory, although other embodiments may use larger or smaller memory areas and/or may use storage on other media such as non-volatile storage. In one embodiment, the VMCB 22 may include the guest's processor state, which may be loaded into a processor in the host hardware 20 when the guest is scheduled to execute and may be stored back to the VMCB 22 when the guest exits (either due to completing its scheduled time, or due to one or more intercepts that the processor detects while executing the guest). In some embodiments, only a portion of the processor state is loaded via the instruction that transfers control to the guest corresponding to the VMCB 22 (the "start virtual machine (SVM)" instruction), and other desired state may be loaded by the VMM 18 prior to executing the SVM instruction. Similarly, in such embodiments, only a portion of the processor state may be stored to the VMCB 22 by the processor on guest exit and the VMM 18 may be responsible for storing any additional state as needed. In other embodiments, the VMCB 22 may include a pointer to another memory area where the processor state is stored.

In one embodiment, the VMM 18 may also have an area of memory allocated to store the processor state corresponding to the VMM 18. When the SVM is executed, the processor state corresponding to the VMM 18 may be saved in the area. When the guest exits, the processor state may be reloaded from the area to permit the VMM 18 to continue execution. In one implementation, for example, the processor may implement a register (e.g. a model specific register, or MSR) to store the address of the VMM 18 save area.

In one embodiment, the VMCB 22 may also include a set of intercept indications, one indication for each intercept event that the processor supports. The intercept indication may indicate whether or not the processor is to intercept the corresponding event. As used herein, an event is "intercepted" in a guest if, should the event occur in the guest, the processor exits the guest for processing of the event (or other processing) in the VMM 18. Thus, in this embodiment, the VMM 18 may configure the processor to intercept only those events that the VMM 18 does not wish the guest 10A-10N to handle internally. Events may include instructions (that is, intercept an instruction instead of executing it), interrupts, exceptions, and/or any other desired events that may occur during guest execution. In other embodiments, the processor may enter a guest mode and intercept on all events supported by the processor.

In one embodiment, the VMCB 22 may further include other control bits that may cause the processor to perform certain actions upon loading the VMCB 22. For example, the control bits may include indications to flush the TLB in the processor. Other control bits may specify the execution environment for the guest (e.g. interrupt handling modes, an address space identifier for the guest, etc.). Still other control bits may be used to communicate an exit code describing why the guest exited, etc.

Generally, a "guest" may comprise any one or more software programs that are to be virtualized for execution in the computer system 5. A guest may include at least some code that executes in privileged mode, and thus expects to have full control over the computer system on which it is executing. As mentioned previously, guest 10A is an example in which the guest includes a guest OS 12. The guest OS 12 may be any OS, such as any of the Windows OSs available from Microsoft Corp., (Redmond, Wash.), any UNIX-type operating system such as Linux, AIX from IBM Corporation (Armonk, N.Y.), Solaris from Sun Microsystems, Inc. (Santa Clara, Calif.), HP-UX from Hewlett-Packard Company (Palo Alto, Calif.), etc. The guest 10N is an example of a guest that comprises non-OS privileged code 16.

It is noted that the letter "N" when used herein in reference numerals such as 10N is meant to generically indicate any number of elements bearing that reference numeral (e.g. any number of guests 10A-10N, including one guest). Additionally, different reference numerals that use the letter "N" (e.g. 10N and 14N) are not intended to indicate like numbers of the different elements are provided (e.g. the number of guests 10A-10N may differ from the number of applications 14A-14N) unless otherwise noted.

Memory Virtualization and Paged Real Mode

In one embodiment, one or more processors in the host hardware 20 may support a "paged real mode" in which the processor operates as if it were executing in real mode, except that paging is enabled and thus the "real" addresses generated during execution of the guest 10A-10N are translated through the paging mechanism. Generally, as used herein, the terms "paging", "paging translation mechanism", and "paging address translation mechanism" refer to a translation mechanism in which the input address to the mechanism is translated to a physical address on a page granularity. The physical address is used for access to physical memory in the host hardware 20. The input address has an in-page offset portion, comprising the least significant bits of the address, that is not translated. The page portion of the address (comprising the remainder of the address not including the in-page offset portion) is translated through the paging translation mechanism. A page is a contiguous block of memory aligned to a page boundary address (where a page boundary depends on the page size, but has zeros in the least significant bits that form the in-page offset). Pages may have any desired size, in various embodiments. For example, a 4 kilobyte (k) page is used in many instruction set architectures. Other instruction set architectures define an 8 k page. Still other instruction set architectures support several page sizes in various processor modes. For example, the x86 instruction set architecture supports 4 k, 2 Megabytes (M), and 4 M page sizes. The input address is often referred to as a "virtual address". In the x86 instruction set, the input address to the paging mechanism is referred to as a "linear address".

The paging translation mechanism may include a set of one or more page tables that store the information used to translate from the input address to the corresponding physical address. Memory management software may control the page tables, and may update the page tables to translate a given page of input addresses (a virtual page) to a physical page allocated to the virtual page by the memory management software. The processor may search the page tables when a translation is needed. In some embodiments, the processor may implement a translation lookaside buffer (TLB) to cache recent translation results for reuse in subsequent translations without having to consult the page tables.

Some embodiments of the processor(s) implement the x86 instruction set architecture (including, in some embodiments, the AMD64™ extension defined by Advanced Micro Devices, Inc. (Sunnyvale, Calif.)). The x86 instruction set architecture requires that the processor be in protected mode to enable paging. Protected mode enables privilege level protection mechanisms. As used herein, "privilege level protection" refers to a protection mechanism in which, at any given time, the software executing on the processor has an associated privilege level. At least some processor functionality is restricted to the higher privilege level or levels (the levels that provide more privilege). That is, lower privileged software cannot invoke the functionality. For example, if lower privileged software does attempt to invoke restricted functionality, the processor may generate an exception. The functionality that is restricted to the higher privilege level or levels may include restrictions on memory access, restrictions on procedure entry points, restrictions on the instructions that may be executed, etc. In general, at least two privilege levels may be implemented (referred to as "user" for the lower privilege level and "supervisor" or "kernel" for the higher privilege level). In the x86 instruction set, four privilege levels are defined (with privilege level 0 being the highest privilege level and privilege level 3 being the lowest privilege level).

Additionally, the x86 instruction set enables the use of segmentation protection mechanisms in protected mode. The privilege level of the software being executed is assigned in its code segment. Additionally, various other control bits are defined for various segment attributes. In non-protected mode, the segmentation protection mechanisms may function differently. Each data segment may have an associated privilege level assigned, and only code having at least the required privilege level may access the segment.

Thus, the paged real mode may be a mode in which privilege level protection is disabled but paging is enabled. In embodiments that implement the x86 instruction set architecture, paged real mode may be a mode in which protected mode is disabled but paging is enabled. In such a mode, the segment registers operate as defined for real mode in the x86 instruction set and the software executes as if in real mode (with no privilege level defined and no privilege restrictions to execution). However, the addresses generated during execution are translated through the paging mechanism.

The VMM 18 may use paged real mode in cases in which a guest expects to execute in real mode. The processor may intercept attempts to write the control register or registers in which real mode may be established, to ensure that paged real mode is used instead of real mode. For example, in the x86 instruction set, control register 0 (CR0) may include the control bits used to establish real mode. In addition to intercepting writes to CR0, the VMM 18 may initialize a VMCB 22 for a newly created guest to start in paged real mode, if desired. A newly created guest may be essentially "booting" its virtual machine, and thus may expect to execute in real mode when first executing.

Figure 2:
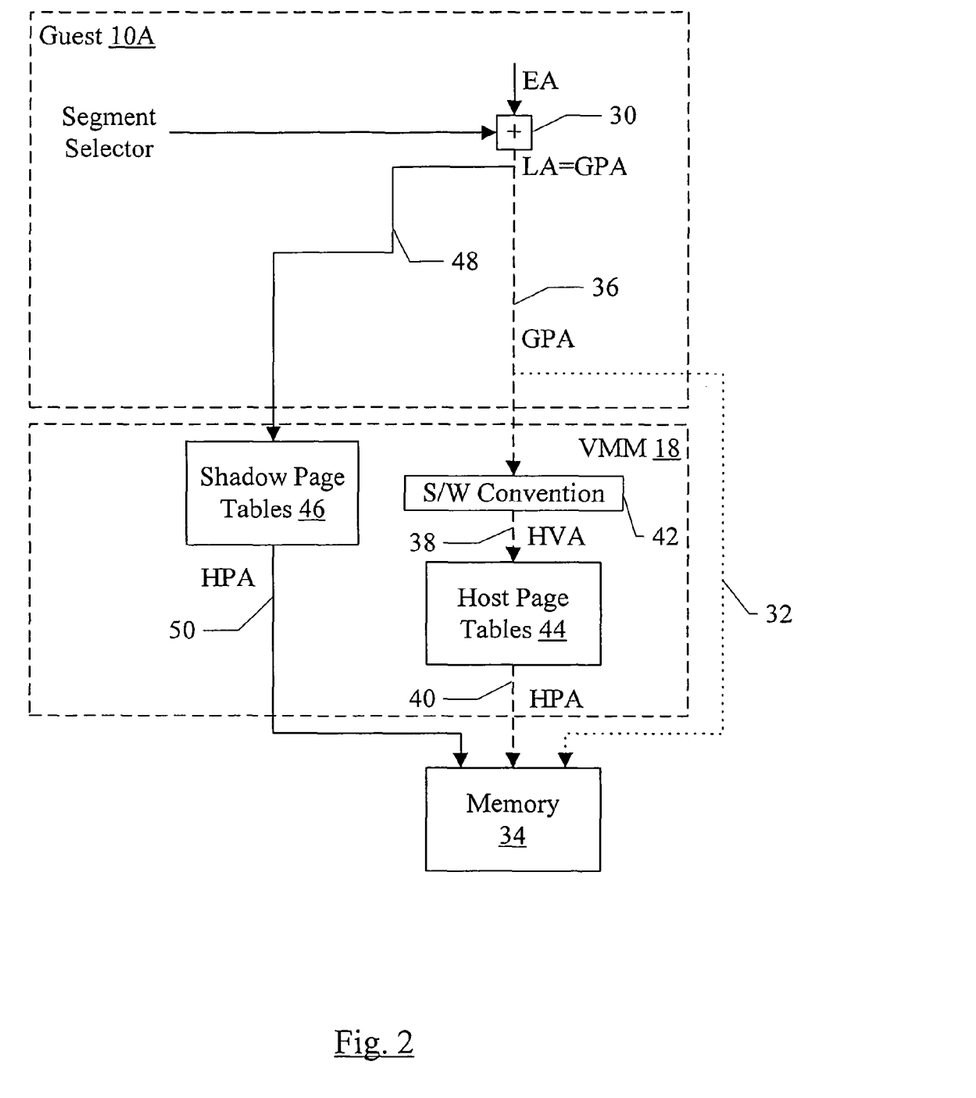
FIG. 2 is a block diagram of one embodiment of a guest and a VMM illustrating address translation when protected mode is disabled and paging is enabled in the guest.

FIG. 2 is a block diagram of one embodiment of a guest 10A and a VMM 18 illustrating address translation when protected mode is disabled and paging is enabled in the guest 10A ("paged real mode"). In the guest 10A, an effective address is formed (EA). For instruction fetches, the EA may be the program counter (PC) of the instruction being fetched. The PC may be generated by incrementing a previously fetched PC, for sequential fetching, or may be generated responsive to executing a control flow instruction such as a branch instruction. For data memory accesses, the EA may be generated from one or more instruction operands.

In paged real mode in this embodiment (and in other non-protected modes), a segment selector from one of the segment registers is added to the EA to generate a linear address (LA), represented by the adder 30 in FIG. 2. More particularly, the segment selector may be left-shifted by 4 bits (filling in the least significant 4 bits with zero) and added to the EA. In some implementations, the EA may not be explicitly generated (e.g. the source(s) used to generate the EA may be directly added to the segment selector). The resulting linear address, in paged real mode, is considered by the guest 10A to be the physical address of the memory location being accessed (the guest physical address, or GPA). The guest 10A presumes that the GPA accesses memory, illustrated in FIG. 2 by the dotted arrow 32 to the memory 34. Thus, the guest 10A does not implement page tables in paged real mode. The segment selector is provided from the code segment register for instruction fetches, and from one of the data segments for data addresses (either a default segment defined for the corresponding instruction or a segment explicitly specified for the instruction).

The dashed arrows 36, 38, and 40 represent the logical progression of the translation from the GPA to a host virtual address (HVA) and ultimately to a host physical address (HPA) that identifies the memory location in the memory 34 to be accessed according to one embodiment. The GPA is mapped, through a software convention implemented by the VMM 18 (reference numeral 42) to the HVA. Any software convention may be used to map each guest's physical addresses to different HVA's in the host's virtual address space. For example, the VMM 18 may assign an offset to each guest 10A-10N, and may add the offset to each GPA from that guest 10A-10N to generate the corresponding HVA. The HVA is input to a set of host page tables 44, which translate the HVA to the HPA.

In one implementation, the VMM 18 provides a set of shadow page tables 46 that directly translate the GPA to the HPA. The shadow page tables 46 may effectively store the result of passing a GPA through the logical process illustrated by dotted arrows 36, 38, and 40. Thus, unless a page fault is detected in the shadow page tables 46 for a given GPA, translation of GPAs during execution of a guest may be performed through the shadow page tables 46 (solid arrows 48 and 50). If the processor executing the guest 10A implements a TLB, translations from the shadow page tables 46 may be cached in the TLB and may be used in a similar fashion as other translations.

As mentioned above, the software in the guest 10A believes that it is executing in real mode when paged real mode is active. Accordingly, the VMM 18 may update the page table base address register (CR3 in the x86 instruction set architecture) in the VMCB 22 of the guest 10A to point to the base address of the shadow page tables 46 (and update the CR0 encoding to enable paging even though protected mode is disabled). In this manner, GPAs are translated to HPAs without the guest 10A's knowledge.

Figure 3:
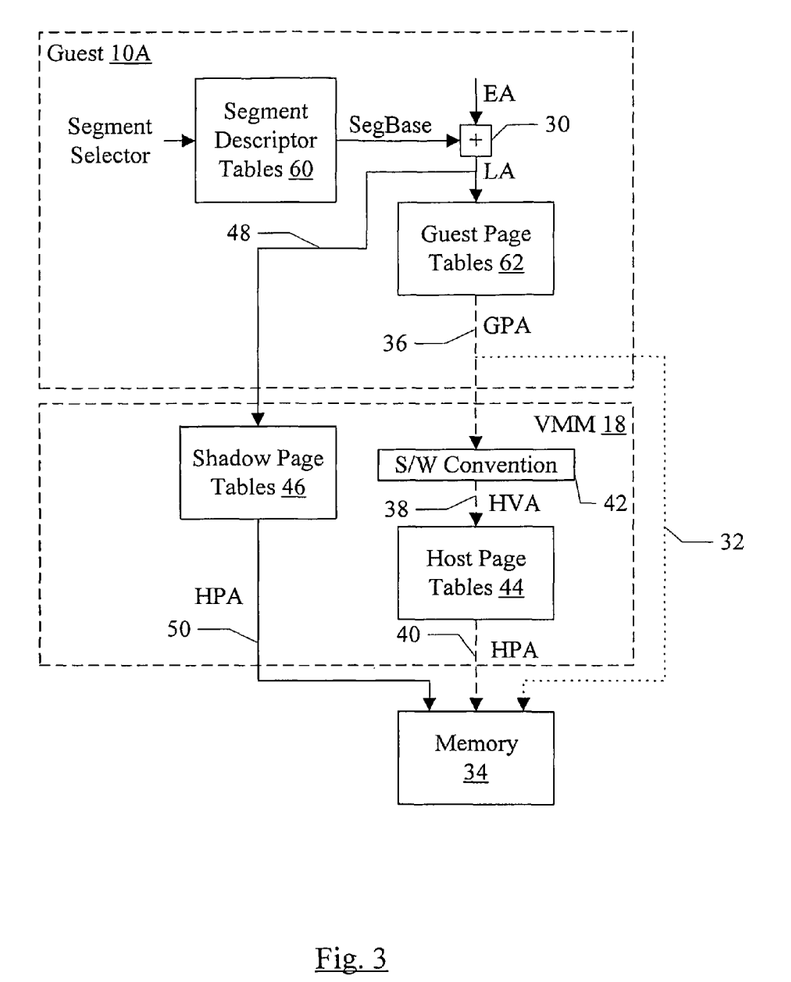
FIG. 3 is a block diagram of one embodiment of a guest and a VMM illustrating address translation when protected mode and paging are enabled in the guest.

FIG. 3 is a block diagram of one embodiment of the guest 10A and the VMM 18 illustrating address translation when protected mode and paging are enabled in the guest 10A. Since protected mode is enabled, the segment selector from the segment register corresponding to the address generation is used as an index to a set of segment descriptor tables 60. The segment descriptor tables 60 are maintained by the guest 10A. Generally, each segment descriptor in the segment descriptor tables 60 includes various protection control bits and also includes a segment base address for the segment (SegBase). The segment base address is added to the EA (generated as described above) to produce the linear address (adder 30). As mentioned above, in some implementations, the EA may not be explicitly generated (e.g. the source(s) used to generate the EA may be directly added to the segment base address). While the segment descriptor tables 60 are illustrated in FIG. 3 to show the logical generation of the linear address, typically the segment registers have a hidden part that stores a representation of the segment descriptor indicated by the segment selector. When the segment register is loaded with a segment selector, the processor may load the corresponding segment descriptor into the hidden part (possibly modifying its format to an internal format). The cached segment descriptor from the hidden part may be used to provide the segment base address.

If paging is enabled in the guest, the memory management software in the guest may maintain guest page tables 62 mapping the linear address to the GPA. If paging is not enabled by the guest 10A, the VMM 18 may still enable paging to ensure that the VMM 18 can remap the GPAs to HPAs, but there may be no guest page tables 62 and the linear address may equal the guest physical address. Again, as with FIG. 2, the GPA is the address that the guest 10A presumes is accessing the memory 34 (dotted arrow 32).

The logical process of mapping the GPA to the HPA may be similar to the described above for FIG. 3 (arrows 36, 38, and 40; software convention 42; and host page tables 44). Also, the shadow page tables 46 are used in the implementation to translate from LA to HPA, similar to the above discussion of translating from the GPA to the HPA (solid arrows 48 and 50). In this case, the shadow page tables 46 may store the net effect of translating through the guest page tables 62 in addition to translating through the software convention 42 and the host page tables 44.

It is noted that, while the example of FIGS. 2 and 3 is based on the x86 instruction set architecture, other embodiments may implement other instruction set architectures. For example, while a segment base address (or segment selector) may be used to generate a linear address in the illustrated embodiment, other embodiments may use other mechanisms to generate a virtual address for translation. For example, in some embodiments, the EA may be the virtual address (or the physical address in real mode). In other embodiments, other mechanisms may be used to translate from the EA to the virtual/physical address.

Figure 4:
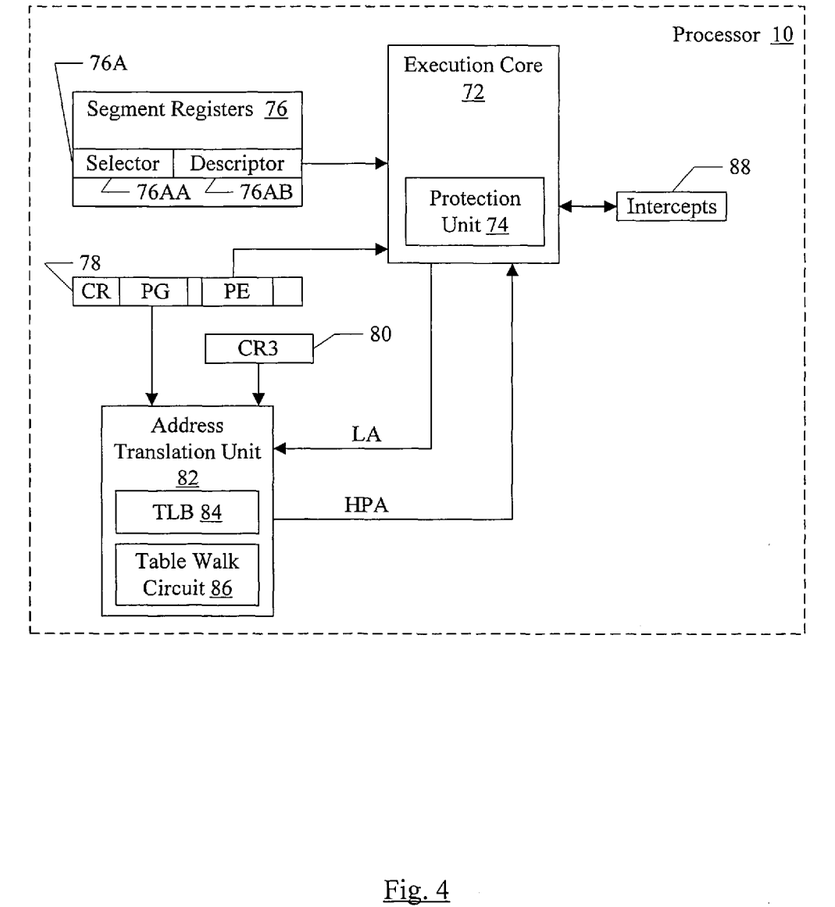
FIG. 4 is a block diagram of a portion of one embodiment of a processor.

Turning now to FIG. 4, a block diagram of one embodiment of a portion of a processor 70 that may be included in the host hardware 20 and support the paged real mode is shown. In the illustrated embodiment, the processor 70 includes an execution core 72 which further includes a protection unit 74, a set of segment registers 76, a control register 78 (CR0) including a paging enable bit (PG) and a protection enable bit (PE), a second control register 80 (CR3), an address translation unit 82 including a TLB 84 and a table walk circuit 86, and one or more intercept registers 88 configured to store various intercepts. The segment registers 76 and intercepts register 88 are coupled to the execution core 72. The execution core 72 is further coupled to receive the PE bit from the CR0 register 78. The address translation unit 82 is coupled to receive the PG bit from the CR0 register 78 and the page table base address from the CR3 register 80. The address translation unit 82 is coupled to receive one or more linear addresses (LA) from the execution core 72 and to return corresponding host physical addresses (HPA) to the execution core 72.

Generally, the execution core 72 is configured to execute the instructions defined in the instruction set architecture implemented by the processor 70 (e.g. the x86 instruction set architecture, including AMD64™ extensions as desired). The execution core 72 may employ any construction. For example, the execution core 72 may be a superpipelined core, a superscalar core, or a combination thereof. The execution core 72 may employ out of order speculative execution or in order execution, in various embodiments. The execution core 72 may include microcoding for one or more instructions or other functions, in combination with any of the above constructions.

The protection unit 74 may enforce the privilege level protections defined in the instruction set if protected mode is enabled via the PE bit. More particularly, privilege level protections may be enabled, in one embodiment, if the PE bit is set and disabled if the PE bit is clear. The protection unit 74 may comprise circuitry, may be implemented in microcode executed by the execution core 72, or a combination of circuitry and microcode. In some embodiments, the protection unit 74 may be implemented in a distributed fashion, with various protections implemented at various points in the execution core 72 that handle operations affected by those protections.

The segment registers 76 store information from the segment descriptors currently being used by the code being executed by processor 10. CS is one of the segment registers 76 and specifies the code segment of memory, including the current privilege level of the code. The code segment stores the code being executed. Other segment registers may define various data segments (e.g. a stack data segment defined by the SS segment register, and up to four data segments defined by the DS, ES, FS, and GS segment registers). FIG. 4 illustrates the contents of an exemplary segment register 76A, including a selector field 76AA and a descriptor field 76AB. The selector field 76AA is loaded with a segment selector to activate a particular segment in response to certain segment load instructions executed by the execution core 72. When an instruction loads a segment selector into one of the segment registers 76 in protected mode, the processor 70 reads the corresponding segment descriptor from the segment descriptor tables 60 and stores information from the segment descriptor into the segment descriptor field (e.g. segment descriptor field 76AB for segment register 76A). The segment descriptor field 76AB may be the "hidden part" of the segment registers mentioned above. The information stored in the segment descriptor field may comprise any suitable subset of the segment descriptor, including all of the segment descriptor, if desired. Additionally, other information derived from the segment descriptor or other sources may be stored in the segment descriptor field, if desired. The contents of the segment registers 76 may be available to the execution core 72 (and more particularly to the protection unit 74).

The execution core 72 may generate linear addresses to fetch instructions for execution, as well as linear addresses of data accesses to memory. The execution core 72 may provide such linear addresses to the address translation unit 82 for translation, and the address translation unit 82 may return corresponding HPAs to the execution core 72. The address translation unit 82 may be enabled by the PG bit from the CR0 register 78. If paging is not enabled (PG bit is clear), the TLB 84 may be filled with identity mapping translations (that is, the LA may equal the HPA). If paging is enabled (PG bit is set), the TLB 84 may store translations from the page tables indicated by the CR3 register 80. In some embodiments that implement address space numbering, the TLB 84 may have a mix of translations from different sets of page tables corresponding to different values in the CR3 register 80, tagged by address space number.

In the illustrated embodiment, the address translation unit 82 may access the TLB 84 for each linear address, and may return the HPA indicated in the TLB 84 if a TLB hit is detected. If a miss is detected the table walk circuit 86 may search the page tables located by the base address in the CR3 register 80 for a translation. If no translation is found, the table walk circuit 86 may generate a page fault for the instruction corresponding to the linear address for which there is no translation. If a translation is found, the table walk circuit 86 may update the TLB to reflect the translation and the corresponding HPA may be provided to the execution core 72. In some embodiments, the table walk circuit 86 may be partially or fully implemented in microcode executed by the execution core 72. It is noted that, in some embodiments, the address translation unit 82 may be implemented in a distributed fashion within the execution core 72. Additionally, the TLB 44 may have any desired construction, including hierarchical levels and/or split instruction and data TLBs.

The execution core 72 may be configured to monitor for various intercepts indicated in the intercept register 88. The intercepts register 88 may be loaded from the VMCB 22 of a guest 10A-10N when execution of that guest 10A-10N is initiated (e.g. using the SVM instruction described above). If the execution core 72 detects an interceptable event and the intercepts register 88 indicates that the detected event is being intercepted, the execution core 72 may exit the guest being executed and return to the VMM 18. If no intercepts are coded in the intercept register 88, then a guest is not in execution. In other embodiments, there may be a "guest mode" bit and all interceptable events may be intercepted.

It is noted that, while the PE bit and PG bit are shown in the present embodiment for enabling protected and enabling paging, respectively, when set, other embodiments may use any encoding of one or more indications to enable the modes. For example, the opposite meanings of the set and clear states of the PE bit and/or PG bit may be used, or multiple bit indications may be used. Other encodings of control register state may be used in other embodiments. For the present embodiment, paged real mode may be the mode in which the PE bit is clear and the PG bit is set.

Figure 5:
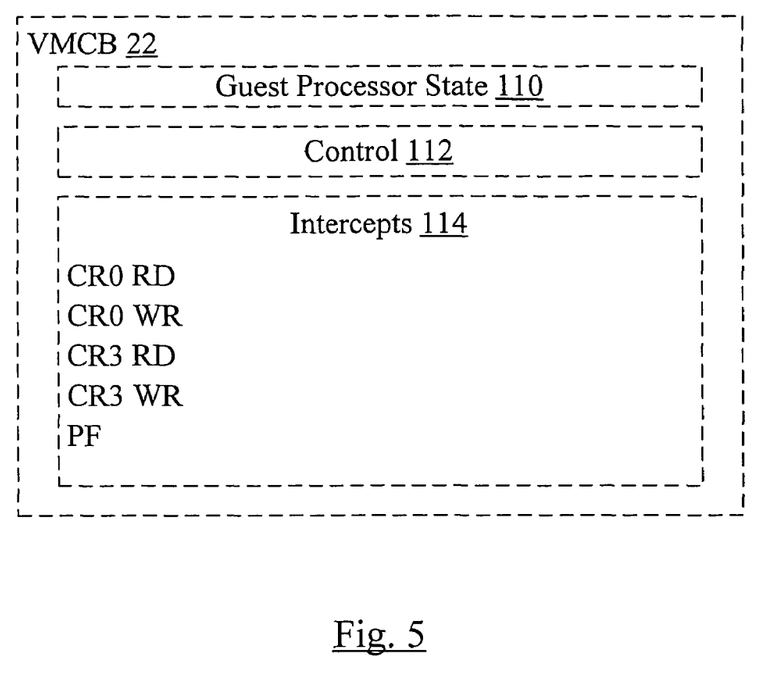
FIG. 5 is a block diagram of one embodiment of a virtual machine control block.

FIG. 5 is a block diagram of one embodiment of a VMCB 22. In the embodiment of FIG. 5, the VMCB 22 may include a guest processor state 110, control data 112, and intercepts 114. As mentioned previously, the guest processor state 110 may include various architected state that corresponds to the processor state at the point at which the guest last exited. The guest processor state 60 may also include implementation-specific state (e.g. model specific registers). For example, the guest processor state 60 may include implementation-specific state that is considered part of the processor's context. The guest processor state 110 may correspond to an initial state of the processor if the guest has not yet executed. Among the processor state stored into the guest processor state 110 on guest exit and loaded from the guest processor state 110 via execution of the SVM instruction may be the contents of the control registers 78 and 80 (CR0 and CR3). In some embodiments, the guest processor state 110 may not be defined to store all processor state. Processor state not stored in the guest processor state 110 may be saved by the VMM 18 in other memory locations (or may be recreated by the VMM 18). Any subset of processor state may be included in the guest processor state 110.

The control data 112 may include any desired control information to be used when execution of the corresponding guest is initiated or exiting. As mentioned previously, the control data 112 may include a guest exit code written by the processor 70 upon guest exit to indicate the reason for guest exit.

The intercepts 114 may specify which events are to be intercepted (causing an exit from the guest). Various intercepts may be defined in various embodiments. In the present embodiment, a CR0 read (RD) intercept, a CR0 write (WR) intercept, a CR3 RD intercept, a CR3 write intercept, and a page fault (PF) intercept may be included in the intercepts 114. The CR0 RD intercept may indicate whether or not reads of the CR0 register 78 are intercepted and the CR0 WR intercept may indicate whether or not writes to the CR0 register 78 are intercepted. Similarly, the CR3 RD and WR intercepts may indicate whether or not reads and writes of the CR3 register 80 are intercepted. In other embodiments, a single intercept may be provided for each register that indicates whether any access to the register is intercepted (read or write). The PF intercept may indicate whether or not page faults detected by the processor are intercepted. Each intercept indication may, e.g., be a bit which may enable the intercept when set or disable the intercept when clear. Other embodiments may assign the opposite meanings to the states of the bit or may use other indications. In paged real mode, the VMM 18 may set each of the intercept bits shown in FIG. 5.

Figure 6:
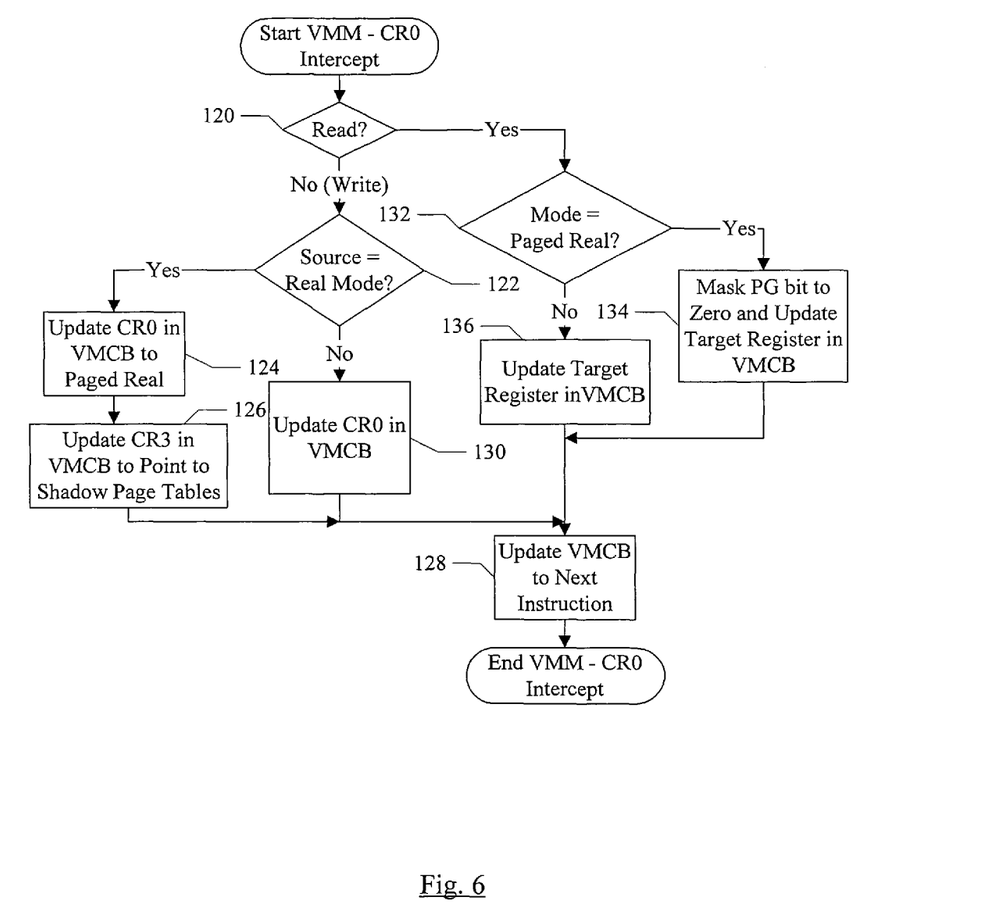
FIG. 6 is a flowchart illustrating operation of one embodiment of a VMM in response to intercepting an access to control register 0 (CR0).
Figure 7:
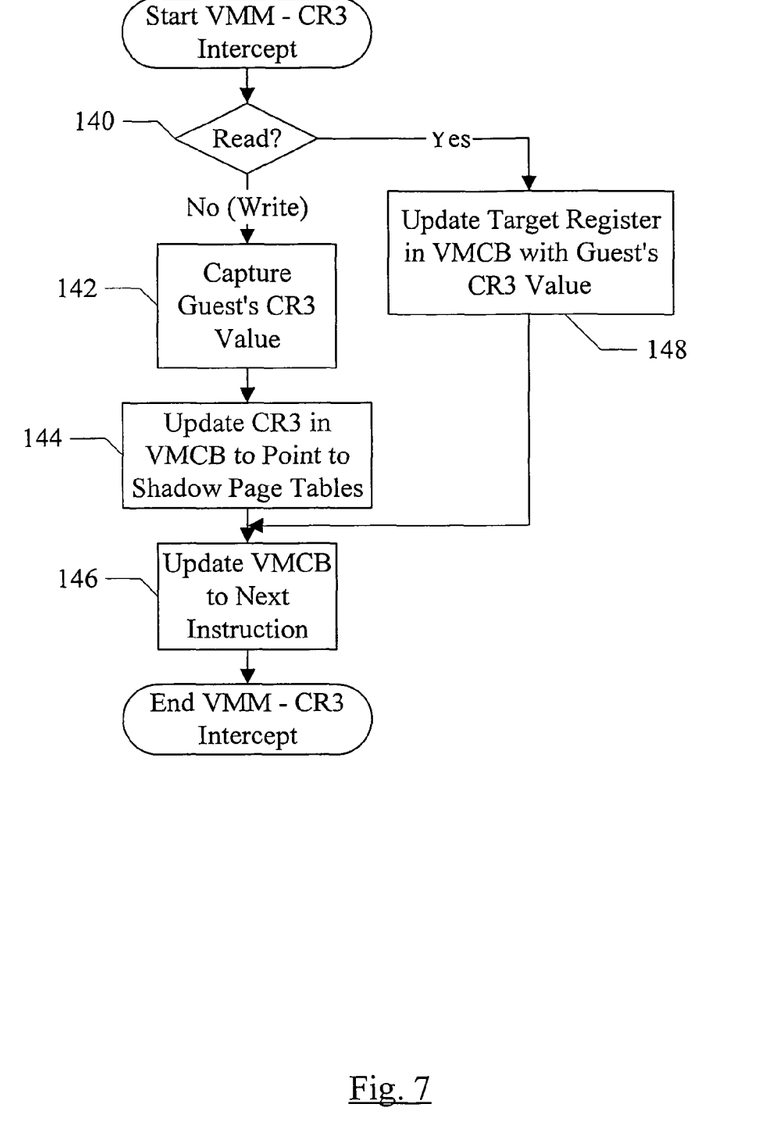
FIG. 7 is a flowchart illustrating operation of one embodiment of a VMM in response to intercepting an access to control register 3 (CR3).
Figure 8:
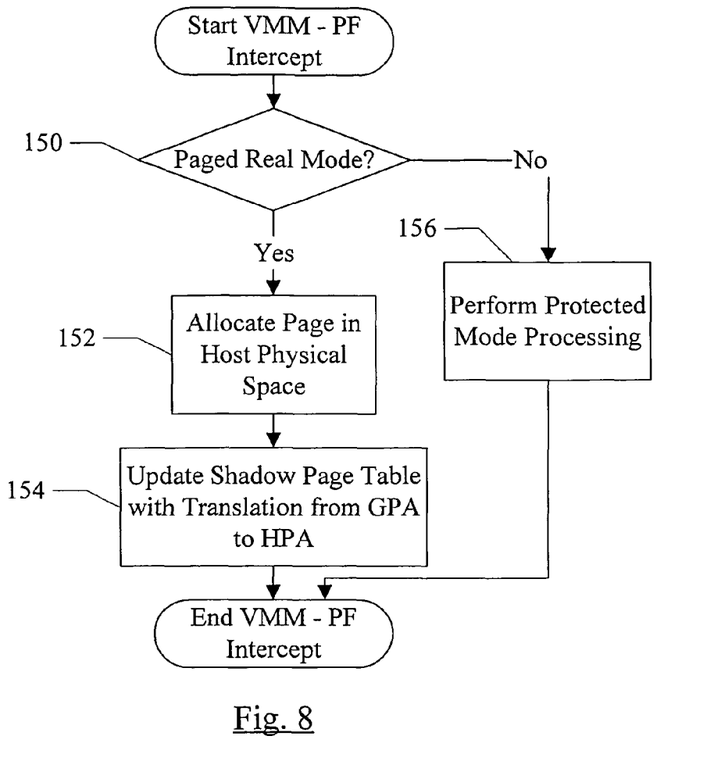
FIG. 8 is a flowchart illustrating operation of one embodiment of a VMM in response to intercepting a page fault in a guest.
Figure 10:
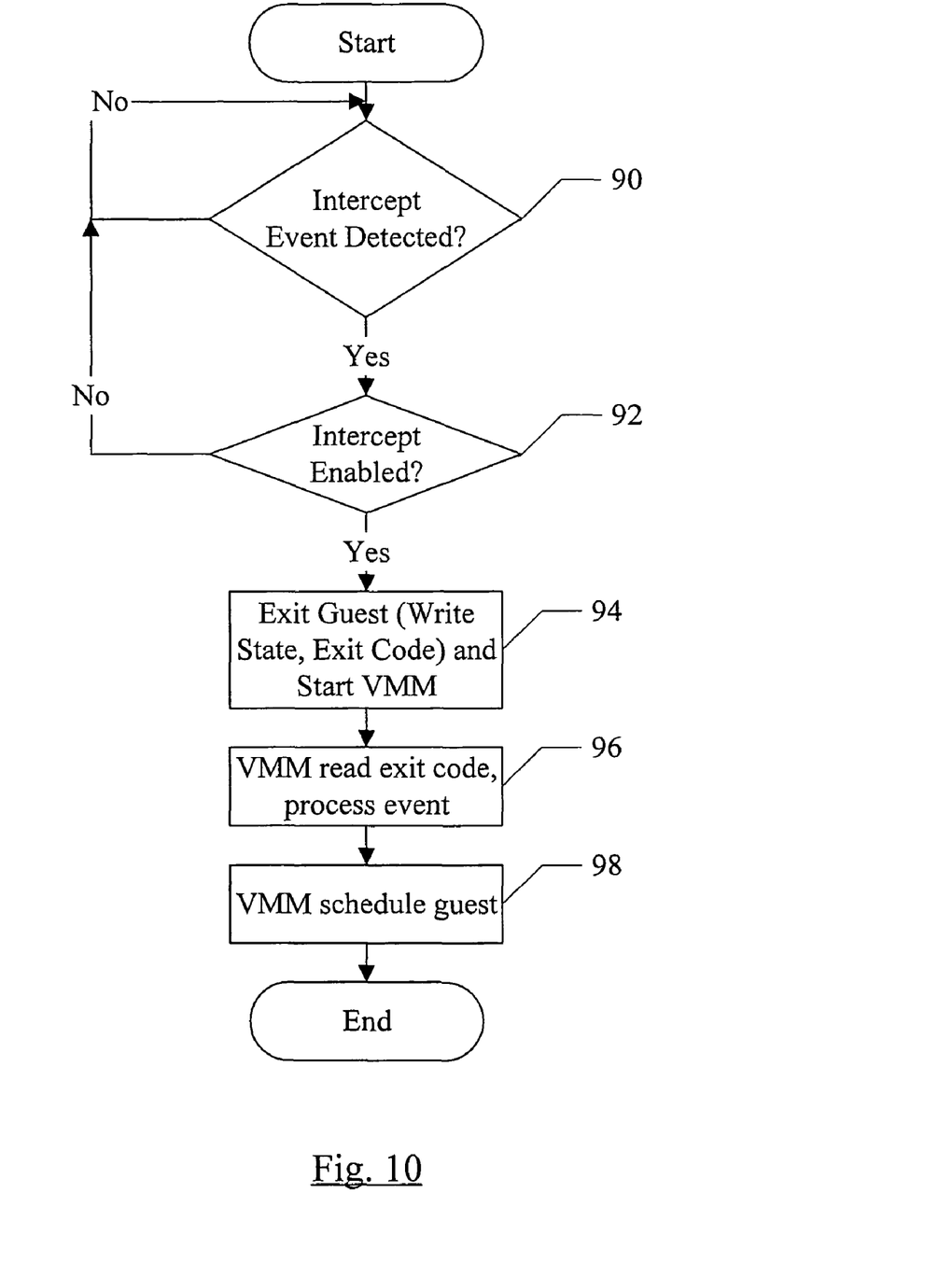
FIG. 10 is a flowchart illustrating one embodiment of intercepting an event in the guest.

FIGS. 6 to 8 are flowcharts illustrating operation of one embodiment of the VMM 18 for the various intercepts defined in FIG. 5. In general, as illustrated in FIG. 10 for one embodiment, while the processor 70 is executing a guest 10A-10N, if an intercept event is detected (decision block 90, "yes" leg) and the corresponding intercept is enabled (in the VMCB 22, and loaded into the processor 70 when execution of the guest is started—decision block 92, "yes" leg) the processor 70 exits the guest, storing processor state into the guest's VMCB 22 and the exit code indicating the reason for exit (e.g. identifying the intercept event that was detected). The VMM 18 may be started in response to the guest exit (block 94). For example, the address of a state save area similar to a VMCB and corresponding to the VMM 18 may be maintained by the processor 70 for starting the VMM. The VMM 18 may read the exit code and process the identified intercept event (e.g. by calling the code represented by the flowcharts of FIGS. 6 to 8—block 96). Subsequently, the VMM 18 may schedule the guest (block 98). Scheduling the guest may include loading the state from the VMCB 22 into the processor 70 and starting the guest (e.g. using the SVM instruction and optionally instructions to load state prior to the SVM instruction).

FIG. 6 is a flowchart illustrating operation of one embodiment of the VMM 18 in response to an intercept of a CR0 access (read or write). The VMM 18 may include instructions which, when executed, implement the operation illustrated in FIG. 6. In other embodiments, the flowchart of FIG. 6 may be divided into portions executed in response to a CR0 read intercept and a CR0 write intercept, respectively.

If the intercepted CR0 access is a write (decision block 120, "no" leg), the VMM 18 may examine a source operand that was to be written to the CR0 register 78 (e.g. by locating the intercepted instruction and determining its source operands). The source operand may be in the guest processor state 110, or may still be available in the current state of the processor 70. If the source operand indicates that the guest 10A-10N was attempting to establish real mode in the processor 70 (e.g. PE and PG clear, in this embodiment—decision block 122, "yes" leg), the VMM 18 may update the CR0 value in the VMCB 22 to indicate paged real mode (e.g. PE clear and PG set, in this embodiment—block 124). Additionally, in some embodiments, the VMM 18 may update the CR3 value in the VMCB 22 to point to the shadow page tables 46 used by the VMM 18 (block 126). Since the guest 10A-10N is attempting to enter real mode, the guest 10A-10N may not itself have initialized the CR3 register 80 and thus no intercept of CR3 may be detected to set CR3. If the source operand does not indicate that the guest 10A-10N was attempting to enter real mode (decision block 122, "no" leg), the VMM 18 may update the CR0 value in the VMCB 22 to reflect the source operand (block 130). The VMM 18 may update the CR0 value to enable paging. The VMM 18 may also update the CR3 value to point to the shadow page tables 46.

In either case, since the VMM 18 has emulated the effect of the CR0 write, the VMM 18 may update the VMCB 22 to indicate the next instruction after the instruction that caused the CR0 write (block 128). For example, the PC may be modified to point to the next instruction. Thus, the next time that execution of the guest 10A-10N is initiated (e.g. via the SVM instruction), the guest 10A-10N may continue execution with the next instruction and the effect of the CR0 write has been reflected in the guest's processor state 110 (as potentially modified by the VMM 18). The CR0 78 may be loaded from the guest's processor state 110 in the VMCB 22 into the processor 70, thus updating the CR0 state to the state generated by the VMM 18. In other embodiments, the VMM 18 may update the source operand in the VMCB 22 and permit the CR0 write to execute the next time that execution of the guest 10A-10N is initiated.

If the intercepted CR0 access is a read (decision block 120, "yes" leg), the VMM 18 may determine if the current state of the CR0 register 78 in the VMCB 22 indicates paged real mode (decision block 132). If the current state of CR0 indicates paged real mode (decision block 132, "yes" leg), the guest 10A-10N may be expecting the CR0 state to be real mode. The VMM 18 may mask the PG bit to zero and update the target register value in the VMCB 22 with the masked value of CR0 (block 134). Thus, the state may appear to be real mode to the guest 10A-10N. If the current state of CR0 does not indicate paged real mode (decision block 132, "no" leg), the VMM 18 may update the target register value in the VMCB 22 with the contents of the CR0 register (block 136). In either case, since the VMM 18 has emulated the effect of the CR0 read, the VMM 18 may update the VMCB 22 to indicate the next instruction after the instruction that caused the CR0 read (block 128). Thus, the next time that execution of the guest 10A-10N is initiated, the guest 10A-10N may continue execution with the next instruction and the effect of the CR0 read has been reflected in the guest's processor state 110 (as potentially modified by the VMM 18). If the target register of the CR0 read is not automatically read from the guest processor state in the VMCB 22 when the guest execution is resumed, the VMM 18 may also update the target register in the processor 70.

FIG. 7 is a flowchart illustrating operation of one embodiment of the VMM 18 in response to an intercept of a CR3 access (read or write). The VMM 18 may include instructions which, when executed, implement the operation illustrated in FIG. 7. In other embodiments, the flowchart of FIG. 7 may be divided into portions executed in response to a CR3 read intercept and a CR3 write intercept, respectively.

If the intercepted CR3 access is a write (decision block 140, "no" leg), the VMM 18 may capture the guest's CR3 value (block 142). That is, the VMM 18 may capture the value that the guest was attempting to write into the CR3 register. The VMM 18 may locate the instruction that caused the CR3 write, determine its source operand, and read the state of the source operand from the VMCB 22 or from the source operand location in the processor 70. The VMM 18 may store the captured CR3 value so that it can be used for subsequent CR3 reads (e.g. in a location within the VMCB 22, or in a data structure maintained by the VMM 18). The VMM 18 may update the CR3 value in the VMCB 22 to point to the shadow page tables 46 that correspond to the guest page tables 62 indicated by the guest's CR3 value (block 144). Thus, the VMM 18 may override the guest's page tables 62 with the shadow page tables 46.

Since the VMM 18 has emulated the effect of the CR3 write, the VMM 18 may update the VMCB 22 to indicate the next instruction after the instruction that caused the CR3 write (block 146). Thus, the next time that execution of the guest 10A-10N is initiated, the guest 10A-10N may continue execution with the next instruction and the effect of the CR3 write has been reflected in the guest's processor state 110 (as modified by the VMM 18). The CR3 state may be loaded from the guest's processor state 110 in the VMCB 22 into the processor 70 when the guest's execution is resumed (e.g. via the SVM instruction), thus updating the CR3 80 to the state generated by the VMM 18.

If the intercepted CR3 access is a read (decision block 140, "yes" leg), the VMM 18 may update the target register's value in the VMCB 22 with the guest's CR3 value, captured at the most recent write of the CR3 by that guest (block 148). Thus, the guest 10A-10N may be provided with its own CR3 value (pointing to the guest page tables 62) rather than the current contents of the CR3 register 80, which point to the shadow page tables 46. Since the VMM 18 has emulated the effect of the CR3 read, the VMM 18 may update the VMCB 22 to indicate the next instruction after the instruction that caused the CR3 read (block 146). Thus, the next time that execution of the guest 10A-10N is initiated, the guest 10A-10N may continue execution with the next instruction and the effect of the CR3 read has been reflected in the guest's processor state (as modified by the VMM 18). If the target register of the CR3 read is not automatically read from the guest processor state 110 in the VMCB 22 when the guest execution is resumed (e.g. by executing the SVM instruction), the VMM 18 may also update the target register in the processor 70.

In one embodiment, access to the CR0 register 78 and the CR3 register 80 is privileged. If the guest 10A-10N is operating in protected mode and does not have sufficient privilege level to access the CR0 register 78 or the CR3 register 80, the processor 70 may take an exception on the CR0/CR3 access rather than intercept to the flowcharts of FIGS. 6 and 7. Alternatively, in addition to the operation shown in the flowcharts of FIGS. 6 and 7, the VMM 18 may check for appropriate privilege level prior to updating the CR0/CR3 value or providing the CR0/CR3 value.

FIG. 8 is a flowchart illustrating operation of one embodiment of the VMM 18 in response to an intercept of a page fault. The VMM 18 may include instructions which, when executed, implement the operation illustrated in FIG. 8.

If the guest 10A-10N that experienced the page fault is executing in paged real mode (decision block 150, "yes" leg), the VMM 18 may allocate a page in the host physical address space for the guest physical address (GPA) for which there is no translation (block 152). Any mechanism for selecting a page to be allocated may be used, including any mechanism implemented in standard memory management software. The VMM 18 may update the shadow page tables 46 with a translation from the GPA to the HPA (block 154). Subsequently, execution of the guest 10A-10N may be resumed at the instruction that experienced the page fault.

If the guest 10A-10N that experienced the page fault is not executing in paged real mode (decision block 150, "no" leg), protected mode processing may be performed (block 156). Generally, protected mode processing may involve allocating a page for the linear address that has no translation in the shadow page tables 46. Protected mode processing may include any desired mechanism for allocating a page. For example, the protected mode processing may include examining the guest page tables 62 in addition to the host page tables 44 to identify a suitable page to allocate for the linear address that has no translation. The VMM 18 may update the shadow page tables 46 with a translation from the linear address to the HPA, in addition to updating the host page tables 62 with a translation from the corresponding HVA to HPA. In some embodiments, protected mode processing may also include passing on the page fault to the guest, if the guest page tables indicate a fault.

It is noted that, in some embodiments, there may be additional intercepts that may be used to manage the shadow page tables 46. For example, the x86 instruction set architecture defines a control bit in another control register (CR4) that controls the format of page table entries. If that control bit is changed, the format of the page tables changes. The AMD64™ extension defines a different format for the page tables in "long mode" (a mode in which the AMD64™ extensions are enabled). Thus, writes to the control register that causes long mode to be enabled may be intercepted and writes to CR4 may be intercepted.

It is noted that, in some embodiments, the VMM 18 may write-protect the pages in the guest page tables 62 to detect updates by the guest to the guest page tables 62. In this manner, the VMM 18 may monitor changes to the guest page tables 62 to aid in page management decisions.

It is noted that, while the above embodiments describe the VMM 18 as being implemented in software, other embodiments of the VMM 1.8 may be implemented in hardware, or in a combination of software and hardware.

Figure 9:
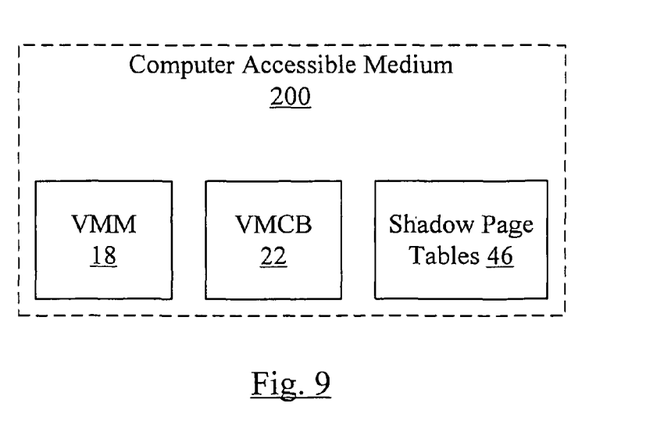
FIG. 9 is a block diagram of one embodiment of a computer accessible medium.

Turning now to FIG. 9, a block diagram of a computer accessible medium 200 is shown. Generally speaking, a computer accessible medium may include any media accessible by a computer during use to provide instructions and/or data to the computer. For example, a computer accessible medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. The computer accessible medium 200 in FIG. 9 may store one or more of the VMM 18, a VMCB 22, and/or shadow page tables 46. The VMM 18 may comprise instructions which implement the operations described for the VMM 18 herein. Generally, the computer accessible medium 200 may store any set of instructions which, when executed, implement a portion or all of the flowcharts shown in one or more of FIGS. 6-8. The computer accessible medium 200 may, in some embodiments, be part of the host hardware 20.

Numerous variations and modifications will become apparent to those skilled in the art once the above disclosure is fully appreciated. It is intended that the following claims be interpreted to embrace all such variations and modifications.

What is claimed is:

1. A processor comprising:
one or more registers configured to store a plurality of control indications, wherein a first mode of the processor corresponds to a first state of the plurality of control indications, and wherein, in the first mode, privilege level protection is disabled, paging is enabled, and a guest is in execution on the processor;
an address translation unit coupled to the one or more registers, wherein the address translation unit is configured to translate addresses generated by the processor during execution using one or more page tables if paging is enabled;
a protection unit coupled to the one or more registers, wherein the protection unit is configured to enforce privilege level protection if privilege level protection is enabled; and
an execution core configured to intercept a write to the one or more registers to permit software to establish the first mode.

2. The processor as recited in claim 1 further comprising a plurality of segment registers, each of the plurality of segment registers configured to store a segment selector, and wherein, if privilege level protection is disabled, the segment selector from one of the plurality of segment registers is used to form a base address to which an effective address is added to provide an input to the address translation unit.

3. The processor as recited in claim 2 wherein, if privilege level protection is enabled, the segment selector is an index into a segment descriptor table to select a segment descriptor, and wherein the segment descriptor stores the base address and one or more protection control indications.

4. The processor as recited in claim 1 wherein the plurality of control indications comprise a protection enable indication and a paging enable indication.

5. A method comprising:
intercepting a write to a control register by a guest executing in a processor;
determining that the write attempts to establish a first mode in the processor in which privilege level protection is disabled and paging is disabled; and
causing the guest to execute in a second mode in which privilege level protection is disabled and paging is enabled instead of the first mode.

6. The method as recited in claim 5 further comprising:
intercepting a read to the control register by the guest; and
causing a state to be returned in response to the read that indicates the first mode, even though the second mode is in use.

7. The method as recited in claim 5 wherein causing the guest to execute in the second mode comprises providing a state for storage in the control register that, when written to the control register, causes the processor to operate in the second mode.

8. The method as recited in claim 7 wherein a storage area in memory is allocated to the guest, and wherein providing the state comprises storing the state in the storage area.

9. The method as recited in claim 8 further comprising initiating execution of the guest on the processor, the initiating including loading the state from the storage area into the guest.

10. The method as recited in claim 5 further comprising providing one or more page tables to store translations for addresses generated during execution of the guest in the second mode.

11. The method as recited in claim 10 further comprising:
intercepting a page fault during execution of the guest;
allocating a page in response to the page fault; and
updating the one or more page tables with a translation to the page.

12. The method as recited in claim 10 wherein the guest does not maintain a second set of one or more page tables in the second mode.

13. The method as recited in claim 12 wherein, in a third mode, the guest maintains the second set of one or more page tables, and wherein the one or more page tables are used in place of the second set of one or more page tables.

14. A computer accessible storage medium storing a plurality of instructions comprising one or more instructions which, when executed in response to a processor intercepting a write to a control register by a guest executing in a processor:
determine that the write attempts to establish a first mode in the processor in which privilege level protection is disabled and paging is disabled; and
cause the guest to execute in a second mode in which privilege level protection is disabled and paging is enabled instead of the first mode.

15. A computer accessible storage medium as recited in claim 14 wherein the plurality of instructions further comprise one or more instructions which, when executed in response to the processor intercepting a read to the control register by the guest:

cause a state to be returned in response to the read that indicates the first mode, even though the second mode is established.

16. A computer accessible storage medium as recited in claim 14 wherein the one or more instructions which, when executed, cause the guest to execute in the second mode comprise one or more instructions which, when executed, provide a state for storage in the control register that, when written to the control register, causes the processor to operate in the second mode.

17. A computer accessible storage medium as recited in claim 16 wherein a storage area in memory is allocated to the guest, and wherein the one or more instructions which, when executed, provide the state comprise one or more instructions which, when executed, store the state in the storage area.

18. A computer accessible storage medium as recited in claim 17 wherein the plurality of instructions further comprise one or more instructions which, when executed, initiate execution of the guest on the processor, the initiating including loading the state from the storage area into the guest.

19. A computer accessible storage medium as recited in claim 14 wherein the plurality of instructions further comprise one or more instructions which, when executed, provide one or more page tables to store translations for addresses generated during execution of the guest in the second mode.

20. A computer accessible storage medium as recited in claim 14 wherein the plurality of instructions further comprise one or more instructions which, when executed in response to the processor intercepting a page fault during execution of the guest:

allocate a page in response to the page fault; and
update the one or more page tables with a translation to the page.

21. A processor comprising:

one or more registers configured to store a plurality of control indications, wherein a first mode of the processor corresponds to a first state of the plurality of control indications, and wherein, in the first mode, protected mode is disabled, paging is enabled, and a guest is in execution on the processor;

an address translation unit coupled to the one or more registers, wherein the address translation unit is configured to translate addresses generated by the processor during execution using one or more page tables if paging is enabled;

a protection unit coupled to the one or more registers, wherein the protection unit is configured to enforce protection if protected mode is enabled; and an execution core configured to intercept a write to the one or more registers to permit software to establish the first mode.

22. The processor as recited in claim 21 further comprising a plurality of segment registers, each of the plurality of segment registers configured to store a segment selector, and wherein, if protected mode is disabled, the segment selector from one of the plurality of segment registers is used to form a base address to which an effective address is added to provide an input to the address translation unit.

23. The processor as recited in claim 22 wherein, if protected mode is enabled, the segment selector is an index into a segment descriptor table to select a segment descriptor, and wherein the segment descriptor stores the base address and one or more protection control indications.

24. The processor as recited in claim 21 wherein the plurality of control indications comprise a protection enable indication and a paging enable indication.

* * * * *